(12) United States Patent
Sato

(10) Patent No.: US 10,659,631 B2
(45) Date of Patent: *May 19, 2020

(54) INFORMATION PROCESSING APPARATUS, INFORMATION PROCESSING METHOD, AND NON-TRANSITORY COMPUTER READABLE MEDIUM FOR DISPLAYING SIMPLIFIED OPERATION SCREEN

(71) Applicant: FUJI XEROX CO., LTD., Tokyo (JP)

(72) Inventor: Koichi Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,293

(22) Filed: Dec. 12, 2017

(65) Prior Publication Data

US 2018/0103162 A1 Apr. 12, 2018

Related U.S. Application Data

(63) Continuation of application No. 15/445,427, filed on Feb. 28, 2017, now Pat. No. 9,992,362.

(30) Foreign Application Priority Data

Jul. 21, 2016 (JP) .................................. 2016-143716

(51) Int. Cl.
*G06F 15/00* (2006.01)
*G06F 3/12* (2006.01)
(Continued)

(52) U.S. Cl.
CPC .......... *H04N 1/00411* (2013.01); *G06T 3/40* (2013.01); *H04N 1/00307* (2013.01); *H04N 1/00413* (2013.01); *H04N 2201/0094* (2013.01)

(58) Field of Classification Search
CPC .......... H04N 1/00411; H04N 1/00413; H04N 2201/0094; G06T 3/40
(Continued)

(56) References Cited

U.S. PATENT DOCUMENTS 9,386,230 B1* 7/2016 Duran .................... H04N 9/735
2006/0092459 A1 5/2006 Kimura et al.
(Continued)

FOREIGN PATENT DOCUMENTS

JP 2003-058292 A 2/2003
JP 2003-131775 A 5/2003
(Continued)

OTHER PUBLICATIONS

Mar. 10, 2020 Office Action issued in Japanese Patent Application No. 2016-143716.

*Primary Examiner* — Douglas Q Tran
(74) *Attorney, Agent, or Firm* — Oliff PLC

(57) ABSTRACT

An information processing apparatus includes an acquisition unit that acquires, from a terminal apparatus, control information including model identification information for identifying a model of the terminal apparatus and setting information concerning display setting of a screen of the terminal apparatus; and a controller that causes a screen on which fewer display items than an ordinary screen are displayed to be displayed on a display in a case where the model identification information included in the control information indicates a specific model or in a case where the setting information included in the control information indicates specific setting.

6 Claims, 12 Drawing Sheets

(51) Int. Cl.
  *G06K 1/00* (2006.01)
  *H04N 1/00* (2006.01)
  *G06T 3/40* (2006.01)
(58) Field of Classification Search
  USPC .............................. 358/1.15, 1.13, 1.14, 1.1
  See application file for complete search history.

(56) References Cited

U.S. PATENT DOCUMENTS

2016/0061579 A1* 3/2016 Tsujimoto ............ G01B 21/047
                                                    702/155
2017/0214809 A1   7/2017 Kato et al.
2018/0364958 A1* 12/2018 Ohara ................... G06F 3/1205

FOREIGN PATENT DOCUMENTS

| | | |
|---|---|---|
| JP | 2006-231760 A | 9/2006 |
| JP | 2006-325267 A | 11/2006 |
| JP | 2009-302890 A | 12/2009 |
| JP | 2014-078076 A | 5/2014 |

* cited by examiner

INFORMATION PROCESSING APPARATUS, INFORMATION PROCESSING METHOD, AND NON-TRANSITORY COMPUTER READABLE MEDIUM FOR DISPLAYING SIMPLIFIED OPERATION SCREEN

CROSS-REFERENCE TO RELATED APPLICATIONS

This is a continuation application of U.S. application Ser. No. 15/445,427 filed Feb. 28, 2017, which is based on and claims priority under 35 USC 119 from Japanese Patent Application No. 2016-143716 filed Jul. 21, 2015. The disclosures of the prior applications are hereby incorporated by reference herein in their entirety.

BACKGROUND

(i) Technical Field

The present invention relates to an information processing apparatus, an information processing method, and a non-transitory computer readable medium.

(ii) Related Art

In some cases, a simplified operation screen is displayed on a terminal apparatus. The simplified operation screen is, for example, a screen displaying fewer items than an ordinary operation screen or a screen displaying characters of a larger size than an ordinary operation screen.

SUMMARY

Even in a case where a simplified operation screen is used on a terminal apparatus, an ordinary operation screen is sometimes displayed on an information processing apparatus other than the terminal apparatus. In such a case, a user of the terminal apparatus is forced to operate the ordinary operation screen when the user uses this information processing apparatus.

According to an aspect of the invention, there is provided an information processing apparatus including an acquisition unit that acquires, from a terminal apparatus, control information including model identification information for identifying a model of the terminal apparatus and setting information concerning display setting of a screen of the terminal apparatus; and a controller that causes a screen on which fewer display items than an ordinary screen are displayed to be displayed on a display in a case where the model identification information included in the control information indicates a specific model or in a case where the setting information included in the control information indicates specific setting.

BRIEF DESCRIPTION OF THE DRAWINGS

Exemplary embodiments of the present invention will be described in detail based on the following figures, wherein.

DETAILED DESCRIPTION

First Embodiment

Figure 1:
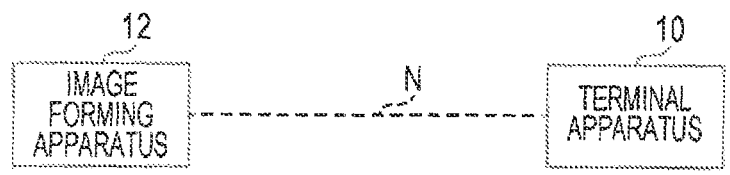
FIG. 1 is a block diagram illustrating an image forming system according to First Embodiment of the present invention.

An image forming system that is an information processing system according to First Embodiment of present invention is described below with reference to FIG. 1. FIG. 1 illustrates an example of the image forming system according to First Embodiment. The image forming system includes a terminal apparatus 10 and an image forming apparatus 12 that is an information processing apparatus. The terminal apparatus 10 and the image forming apparatus 12 have a function of communicating with each other over a communication pathway N. In the example illustrated in FIG. 1, a single terminal apparatus 10 and a single image forming apparatus 12 are included in the image forming system. Note, however, that plural terminal apparatuses 10 may be included in the image forming system and plural image forming apparatuses 12 may be included in the image forming system. Other apparatuses may be included in the image forming system.

The terminal apparatus 10 is, for example, a mobile terminal apparatus such as a smartphone, a mobile phone, or a tablet PC (personal computer) and has a function of exchanging data with another apparatus. The terminal apparatus 10 may be a non-mobile PC. The terminal apparatus 10 has a short-range wireless communication function such as near field communication (NFC) or Bluetooth (Registered Trademark). The NFC may be, for example, wireless communication using a non-contact type IC card. The terminal apparatus 10 may have a wireless communication function such as Wi-Fi (Registered Trademark) communication and wired communication function. Furthermore, the terminal apparatus 10 may have a function of transmitting and receiving data over a network such as the Internet or a local area network (LAN).

The image forming apparatus 12 has an image forming function. The image forming apparatus 12 has, for example, least one of a scan function, a print function, a copy function, and a facsimile function. Furthermore, the image forming apparatus 12 has a function of exchanging data with another apparatus. The image forming apparatus 12 has, for example, a short-range wireless communication function such as NFC or Bluetooth. The image forming apparatus 12 may have a wireless communication function such as Wi-Fi communication and wired communication function. Furthermore, the image forming apparatus 12 may have a function of transmitting and receiving data over a network such as the Internet or a LAN.

The communication pathway N is, for example, a communication pathway created by the short-range wireless communication function. The terminal apparatus 10 and the image forming apparatus 12 may communicate with each other over a communication pathway created by a network such as the Internet or a LAN.

In the image forming system according to First Embodiment, control information including information indicative of the type of operation of the terminal apparatus 10 or information indicative of the model of the terminal apparatus 10 is transmitted from the terminal apparatus 10 to the image forming apparatus 12. A screen displayed on the image forming apparatus 12 is changed in accordance with the control information.

Figure 2:
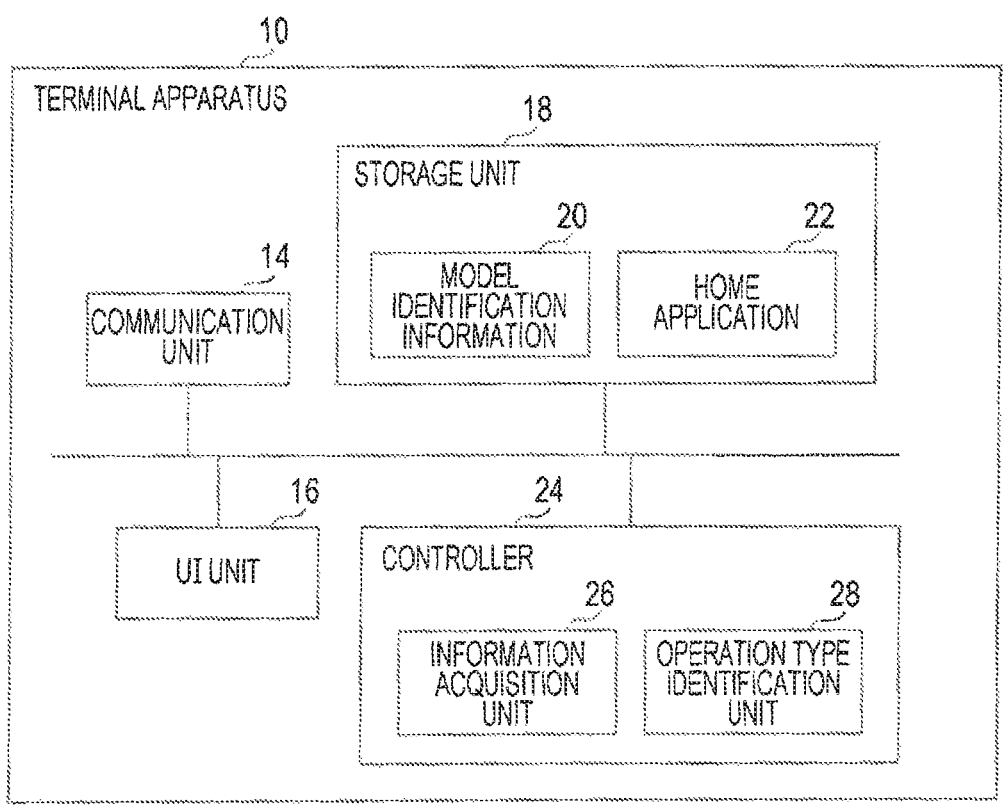
FIG. 2 is a block diagram illustrating a terminal apparatus according to First Embodiment.

A configuration of the terminal apparatus 10 is described in detail below with reference to FIG. 2. FIG. 2 illustrates the configuration of the terminal apparatus 10 according to First Embodiment.

A communication unit 14 is a communication interface and has a function of transmitting data to another apparatus and a function of receiving data from another apparatus. The communication unit 14 has, for example, a short-range wireless communication function. For example, an application for short-range wireless communication is installed in the terminal apparatus 10 and is stored in a storage unit 18, and short-range wireless communication is executed by execution of the application. The communication unit 14 may have a wireless communication function such as Wi-Fi communication and wired communication function. Furthermore, the communication unit 14 may have a function of transmitting and receiving data over a network such as the Internet or a LAN.

A UI unit 16 is a user interface unit and includes a display unit and an operating unit. The display unit is, for example, a display device such as a liquid crystal display. The operating unit is, for example, an input device such as a touch panel or a keyboard. The UI unit 16 may by a user interface (e.g., a touch panel display or a display electronically displaying a keyboard and the like) that has both a function of a display unit and a function of an operating unit.

The storage unit 18 is a storage device such as a hard disc or a memory and stores therein, for example, various programs and various data, which may be stored in different storage devices or may be stored in the same storage device. Furthermore, model identification information 20 and a home application 22 are stored in the storage unit 18.

The model identification information 20 is information for identifying the model of the terminal apparatus 10 and is, for example, a model name or a model number.

The home application 22 is an application (program) for displaying a home operation screen on the UI unit 16. The home operation screen displayed on the terminal apparatus 10 is, for example, a top-level menu screen (main menu screen). The home operation screen may be, for example, a non-top-level menu screen or a setting screen. For example, the home operation screen may be a menu screen for selecting an image forming function or a print setting screen for setting a print condition. For example, an ordinary home operation screen (ordinary version operation screen (ordinary version UI screen)) or a simple home operation screen (simple version operation screen (simple version UI screen)) is displayed as the home operation screen on the UI unit 16. Display items (e.g., icons) such as a display item for giving an instruction to execute a specific application, a display item for performing a specific operation, and a display item for specific setting are displayed on the home operation screen.

The simple version operation screen is a screen on which fewer display items than an ordinary version operation screen are displayed. On the simple version operation screen, a display size of the display items may be larger than that on the ordinary version operation screen or a character size of the display items may be larger than that on the ordinary version operation screen.

At least one of a home application 22 for the ordinary version operation screen and a home application 22 for the simple version operation screen is stored in the storage unit 18. That is, either the home application 22 for the ordinary version operation screen or the home application 22 for the simple version operation screen may be stored in the storage unit 18, or both of the home application 22 for the ordinary version operation screen and the home application 22 for the simple version operation screen may be stored in the storage unit 18. The home application 22 for the ordinary version operation screen is preinstalled in the terminal apparatus 10 and is stored in advance in the storage unit 18. The home application 22 may be preinstalled in the terminal apparatus 10 and stored in advance in the storage unit 18 or may be installed later in the terminal apparatus 10 and stored in the storage unit 18, for example, by downloading the home application 22. For example, the home application 22 for the simple version operation screen may be downloaded and installed in the terminal apparatus 10 in accordance with a user's instruction. The home application 22 for the simple version operation screen may be preinstalled in the terminal apparatus 10, and the home application 22 for the ordinary version operation screen may be installed in the terminal apparatus 10 later.

By execution (activation) of the home application 22, the ordinary version operation screen or the simple version operation screen is displayed on the UI unit 16. In a case where the home application 22 for the ordinary version operation screen or the home application 22 for the simple version operation screen is stored in the storage unit 18, a home operation screen created by the stored home application 22 is displayed on the UI unit 16 by execution of the home application 22. In a case where both of the home application 22 for the ordinary version operation screen and the home application 22 for the simple version operation screen are stored in the storage unit 18, a home operation screen created by the executed home application 22 is displayed on the UI unit 16. For example, when a user gives an instruction to display the ordinary version operation screen or the simple version operation screen, the home application 22 corresponding to the instruction is executed, and thereby the ordinary version operation screen or the simple version operation screen is displayed on the UI unit 16.

A controller 24 controls an operation of each unit of the terminal apparatus 10. The controller 24 includes an information acquisition unit 26 and an operation type identification unit 28.

The information acquisition unit 26 acquires home application information concerning the home application 22. The home application information is information associated with the home application 22 and is, for example, a name or an application ID of the home application 22. For example, in a case where a single home application 22 is stored in the storage unit 18, the information acquisition unit 26 acquires home application information concerning this home application 22. In a case where two home applications 22 are stored in the storage unit 18, the information acquisition unit 26 acquires home application information concerning a home application 22 that is being used in the terminal apparatus 10, i.e., a home application 22 that is running on the terminal apparatus 10. The information acquisition unit 26 may acquire model identification information 20 in addition to or instead of the home application information.

The operation type identification unit 28 identifies the type (the ordinary version operation screen or the simple version operation screen) of the home operation screen of the terminal apparatus 10 on the basis of information acquired by the information acquisition unit 26. For example, in a case where home application information is acquired and the home application information indicates a name, an application ID, or the like of the home application 22 for the ordinary version operation screen, the type of the home operation screen is identified as the ordinary version operation screen. Meanwhile, in a case where the home application information indicates a name, an application ID, or the like of the home application 22 for the simple version operation screen, the type of the home operation screen is identified as the simple version operation screen. The operation type identification unit 28 holds, for example, home application information (e.g., name list) concerning the home application 22 for the simple version operation screen and identifies the type of the home operation screen by comparing the held home application information and the home application information acquired by the information acquisition unit 26.

In another example, the operation type identification unit 28 may identify the type of the home operation screen of the terminal apparatus 10 on the basis of the model identification information 20. For example, the operation type identification unit 28 may hold model identification information indicative of the terminal apparatus 10 in which the home application 22 for the simple version operation screen is preinstalled and identify the type of the home operation screen by comparing the held model identification information and the model identification information 20 acquired by the information acquisition unit 26.

In another example, the operation type identification unit 28 may acquire information indicative of the number of display items within the home operation screen displayed by the home application 22 running on the terminal apparatus 10 and identify the type of the home operation screen on the basis of the number of display items. For example, in a case where the number of display items is equal to or larger than a preset threshold value, the home operation screen is identified as the ordinary version operation screen. Meanwhile, in a case where the number of display items is smaller than the threshold value, the home operation screen is identified as the simple version operation screen. In another example, the type of the home operation screen may be identified on the basis of a difference between the number of display items and a reference number of items. The reference number of items is, for example, the number of display items displayed on the ordinary version operation screen and is a preset number (e.g., a default number of display items). In a case where the number of display items is smaller than the reference number of items and where a difference between the number of display items and the reference number of items is equal to or larger than a preset threshold value, the home operation screen is identified as the simple version operation screen. In a case where the number of display items is equal to or larger than the reference number of items or in a case where the number of display items is smaller than the reference number of items and where a difference between the number of display items and the reference number of items is smaller than the preset threshold value, the home operation screen is identified as the ordinary version operation screen.

Upon identification of the type of the home operation screen, control information including operation type information indicative of the type is transmitted from the terminal apparatus 10 to the image forming apparatus 12.

The operation type identification unit 28 may be provided in the image forming apparatus 12 so that the type of the home operation screen of the terminal apparatus 10 is identified in the image forming apparatus 12. For example, control information including home application information may be transmitted from the terminal apparatus 10 to the image forming apparatus 12, and the type of the home operation screen of the terminal apparatus 10 may be identified on the basis of the home application information in the image forming apparatus 12. In another example, control information including the model identification information 20 may be transmitted from the terminal apparatus 10 to the image forming apparatus 12, and the type of the home operation screen of the terminal apparatus 10 may be identified on the basis of the model identification information 20 in the image forming apparatus 12.

Figure 3:
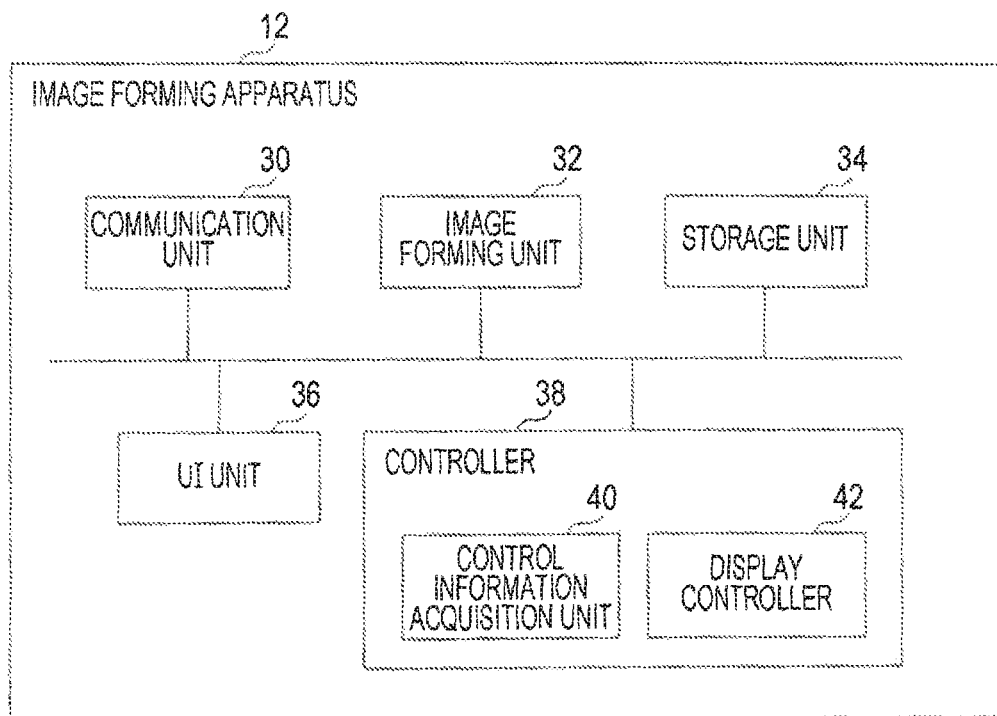
FIG. 3 is a block diagram illustrating an image forming apparatus according to First Embodiment.

A configuration of the image forming apparatus 12 is described in detail below with reference to FIG. 3. FIG. 3 illustrates the configuration of the image forming apparatus 12 according to First Embodiment.

A communication unit 30 is a communication interface and has a function of transmitting data to another apparatus and a function of receiving data from another apparatus. The communication unit 30 has, for example, a short-range wireless communication function. The communication unit 30 may have a wireless communication function such as Wi-Fi communication and a wired communication function. The communication unit 30 may have a function of transmitting and receiving data over a network such as the Internet or a LAN.

An image forming unit 32 performs image forming processing. The image forming unit 32 executes, for example, at least one of a scan function, a print function, a copy function, and a facsimile function. By execution of the scan function, scan data (image data) is generated by scanning a document. By execution of the print function, an image is printed on a recording medium such as a sheet. By execution of the copy function, a document is scanned and printed on a recording medium. By execution of the facsimile function, image data is transmitted or received by facsimile. The image data may be image data generated by scanning a document or may be image data transmitted from another apparatus. A complex function combining plural functions may be executed. For example, a scan transfer function combining a scan function and a transmitting function (transfer function) may be executed. By execution of the scan transfer function, scan data (image data) is generated by scanning a document, and the scan data is transmitted to a destination. This combined function is merely an example, and another combined function may be executed.

A storage unit 34 is a storage device such as a hard disc or a memory and stores therein, for example, execution instruction information (e.g., job information) indicative of an instruction to execute image forming processing, image data to be printed, scan data generated by execution of the scan function, various controls data, various programs, and various data, which may be stored in different storage devices or may be stored in the same storage device.

A UI unit 36 is a user interface unit and includes a display unit and an operating unit. The display unit is, for example, a display device such as a liquid crystal display. The operating unit is, for example, an input device such as a touch panel or a keyboard. The UI unit 36 may be a user interface (e.g., a touch panel display or a display electronically displaying a keyboard and the like) that has both a function of a display unit and a function of an operating unit.

A controller 38 controls an operation of each unit of the image forming apparatus 12. The controller 38 includes a control information acquisition unit 40 and a display controller 42.

The control information acquisition unit 40 acquires control information transmitted from the terminal apparatus 10. The control information acquisition unit 40 receives, for example, control information including operation type identification information, control information including home application information, or control information including model identification information 20 from the terminal apparatus 10 over the communication pathway N created by short-range wireless communication.

The display controller 42 controls display of the UI unit 36. In First Embodiment, the display controller 42 causes the ordinary version operation screen or the simple version operation screen to be displayed on the UI unit 36 in accordance with the control information transmitted from the terminal apparatus 10.

For example, in a case where the control information includes operation type information and where the operation type information indicates the ordinary version operation screen, the display controller 42 causes the ordinary version operation screen to be displayed on the UI unit 36. Meanwhile, in a case where the operation type information indicates the simple version operation screen, the display controller 42 causes the simple version operation screen to be displayed on the UI unit 36. For example, in a case where a home operation screen is displayed on the UI unit 36 of the image forming apparatus 12, the display controller 42 causes an ordinary version home operation screen (ordinary version operation screen) or a simple version home operation screen (simple version operation screen) to be displayed on the UI unit 36 in accordance with information indicated by the operation type information. The home operation screen displayed on the image forming apparatus 12 is, for example, a top-level menu screen (e.g., a main menu screen). The home operation screen may be, for example, a non-top-level menu screen or a setting screen. For example, the home operation screen may be, for example, a menu screen for selection of an image forming function or a print setting screen for setting of a print condition.

In another example, in a case where the control information includes home application information and where the home application information indicates a specific home application (a home application for the simple version operation screen) (e.g., where the home application information indicates a name or an application ID of the home application for the simple version operation screen), the display controller 42 causes the simple version operation screen to be displayed on the UI unit 36. The home application information concerning the home application for the simple version operation screen may be stored in the storage unit 34 of the image forming apparatus 12. Meanwhile, in a case where the home application information does not indicates the specific home application (e.g., in a case where the home application information does not indicate a name or an application ID of the home application for the simple version operation screen), the display controller 42 causes the ordinary version operation screen to be displayed on the UI unit 36.

In another example, in a case where the control information includes model identification information 20 and where the model identification information 20 indicates a specific model (the model of the terminal apparatus 10 in which the home application for the simple version operation screen is preinstalled), the display controller 42 may cause the simple version operation screen to be displayed on the UI unit 36. The model identification information indicative of a specific model may be stored in the storage unit 34 of the image forming apparatus 12. Meanwhile, in a case where the model identification information 20 does not indicates the specific model, the display controller 42 causes the ordinary version operation screen to be displayed on the UI unit 36.

A screen displayed on the terminal apparatus 10 is described in detail below.

Figure 4:
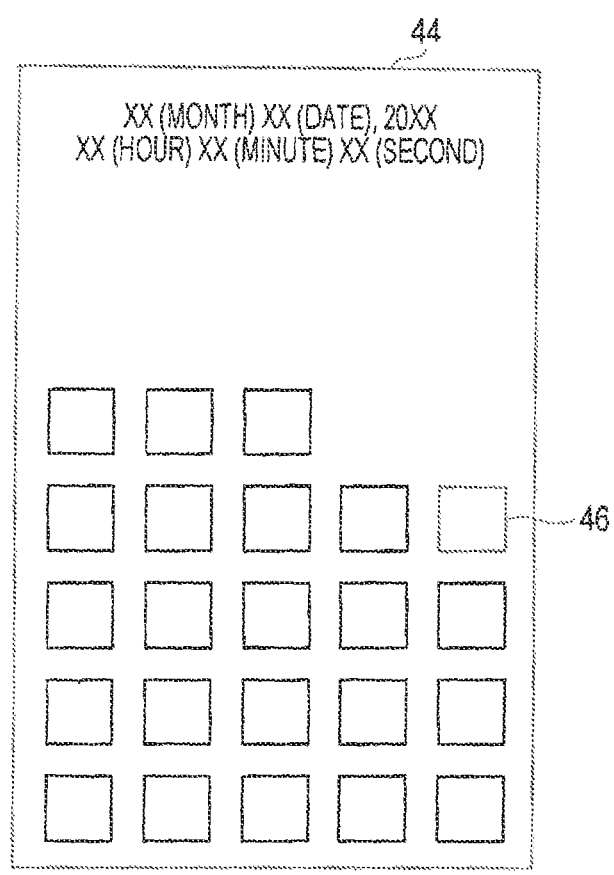
FIG. 4 is a diagram illustrating an example of an ordinary version operation screen displayed on the terminal apparatus.

The ordinary version operation screen displayed on the terminal apparatus 10 is described in detail below with reference to FIG. 4. FIG. 4 illustrates an example of this screen. An ordinary version operation screen 44 is an example of an ordinary version home operation screen (e.g., a main menu screen (top-level menu screen)) displayed on the terminal apparatus 10. In a case where the home application 22 for the ordinary version operation screen 44 is being executed (running) on the terminal apparatus 10, the controller 24 of the terminal apparatus 10, for example, causes the ordinary version operation screen 44 to be displayed as a main menu screen on the UI unit 16. Plural icons 46 (e.g., button images) are displayed as display items on the ordinary version operation screen 44. A specific function (e.g., a function of the terminal apparatus 10) is associated with each of the icons 46. For example, when a user indicates or presses a specific icon 46, a specific function associated with this icon 46 is executed. For examples, icons 46 such as an icon 46 for telephone, an icon 46 for execution of a specific application, and an icon 46 for specific setting are displayed on the ordinary version operation screen 44. The number of icons 46 displayed on the ordinary version operation screen 44 is larger than that on the simple version operation screen. The size of each icon 46 displayed on the ordinary version operation screen 44 may be smaller than that on the simple version operation screen. The size of characters displayed on the ordinary version operation screen 44 may be smaller than that on the simple version operation screen. For example, a character string attached to each icon 46 and a character string indicative of date and time are smaller than those on the simple version operation screen. The displayed position of each icon 46, the number of displayed icons 46, a display size of each icon 46, and the like may be changed by a user.

Figure 5:
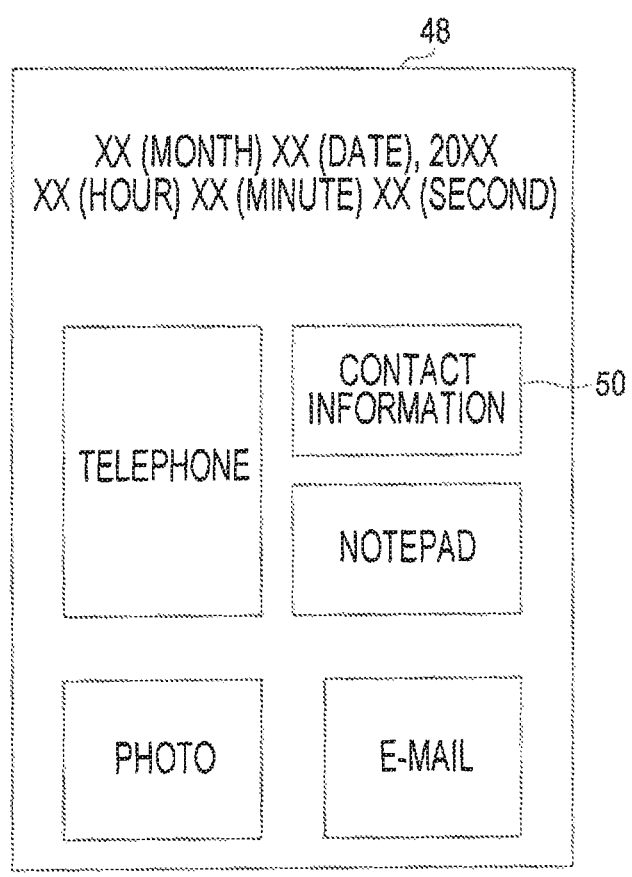
FIG. 5 is a diagram illustrating an example of a simple version operation screen displayed on the terminal apparatus.

A simple version operation screen displayed on the terminal apparatus 10 is described in detail below with reference to FIG. 5. FIG. 5 illustrates an example of this screen. A simple version operation screen 48 is an example of a simple version home operation screen displayed on the terminal apparatus 10. In a case where the home application 22 for the simple version operation screen 48 is being executed (running) on the terminal apparatus 10, the controller 24 of the terminal apparatus 10, for example, causes the simple version operation screen 48 to be displayed as a main menu screen on the UI unit 16. Plural icons 50 (e.g., button images) are displayed as display items on the simple version operation screen 48. A specific function is associated with each of the icons 50. For example, when a user indicates or presses a specific icon 50, a specific function associated with this icon 50 is executed. The number of icons 50 displayed on the simple version operation screen 48 is smaller than that on the ordinary version operation screen 44. For example, an upper limit of the number of icons 50 displayed on the simple version operation screen 48 is smaller than that on the ordinary version operation screen 44. The upper limit may be set in advance or may be changed by a user. The icons 50 displayed on the simple version operation screen 48 may be icons associated with functions designated by a user or may be icons associated with preset functions (e.g., major functions). In the example illustrated in FIG. 5, an icon 50 for telephone, an icon 50 for contact information (e.g., address book), an icon 50 for a notepad, an icon 50 for a photo function, and an icon 50 for e-mail are displayed on the simple version operation screen 48. The size of each icon 50 displayed on the simple version operation screen 48 may be larger than that on the ordinary version operation screen 44. The size of characters displayed on the simple version operation screen 48 may be larger than that on the ordinary version operation screen 44. For example, character string attached to each icon 50 and a character string indicative of date and time are larger than those on the ordinary version operation screen 44. The displayed position of each icon 50, the number of displayed icons 50, a display size of each icon 50, and the like may be changed by a user.

For example, the ordinary version operation screen 44 illustrated in FIG. 4 is displayed as a home operation screen on the terminal apparatus 10 in which the home application 22 for the ordinary version operation screen 44 is installed and the home application 22 for the simple version operation screen 48 is not installed. The simple version operation screen 48 illustrated in FIG. 5 is displayed as a home operation screen on the terminal apparatus 10 in which the home application 22 for the ordinary version operation screen 44 is not installed and the home application 22 for the simple version operation screen 48 is installed. A home operation screen corresponding to a home application 22 that is running is displayed on the terminal apparatus 10 in which both of the home application 22 for the ordinary version operation screen 44 and the home application 22 for the simple version operation screen 48 are installed. For example, in a case where the home application 22 for the ordinary version operation screen 44 is running, the ordinary version operation screen 44 is displayed on the UI unit 16 of the terminal apparatus 10. In a case where the home application 22 for the simple version operation screen 48 is running, the simple version operation screen 48 is displayed on the UI unit 16 of the terminal apparatus 10.

A screen displayed on the image forming apparatus 12 is described in detail below.

Figure 6:
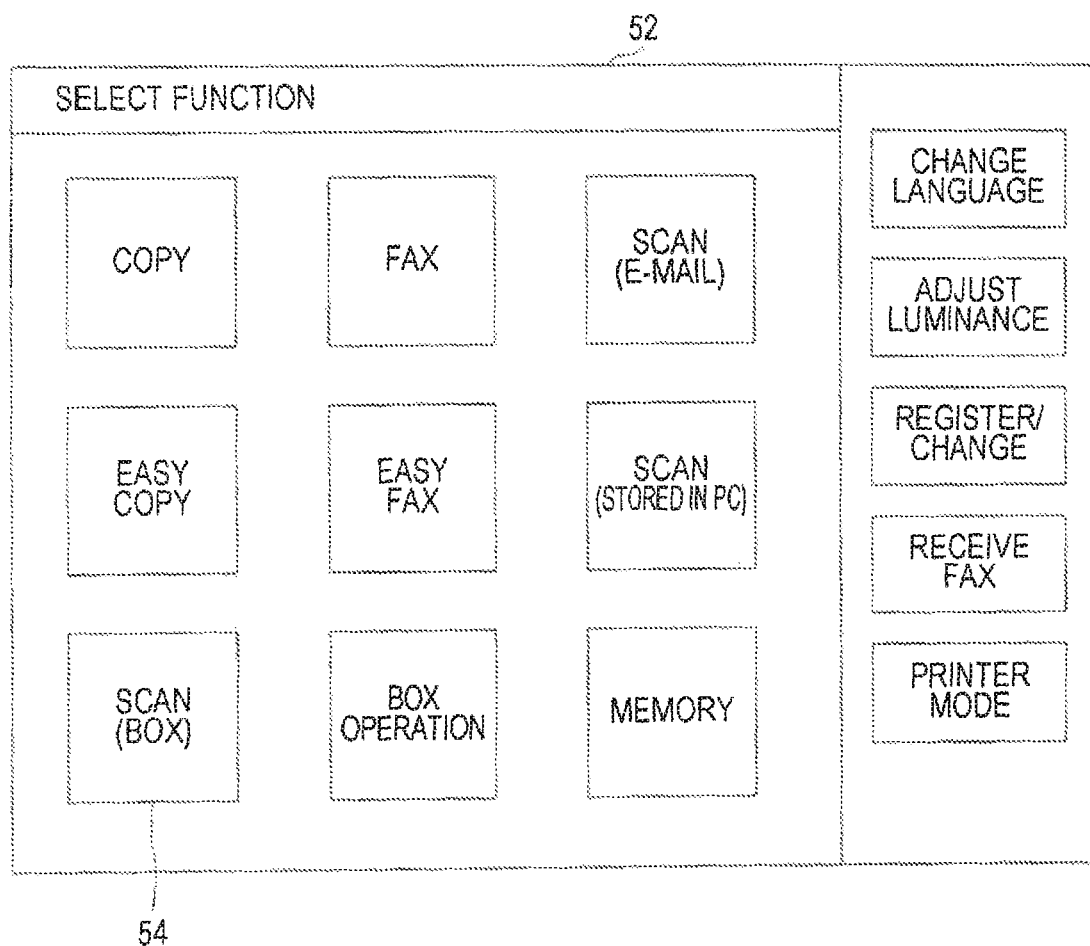
FIG. 6 is a diagram illustrating an example of an ordinary version operation screen displayed on the image forming apparatus.

An ordinary version operation screen displayed on the image forming apparatus 12 is described in detail below with reference to FIG. 6. FIG. 6 illustrates an example of this screen. An ordinary version operation screen 52 is an example of an ordinary version home operation screen (e.g., a main menu screen (top-level menu screen)) displayed on the image forming apparatus 12. In a case where the home application for the ordinary version operation screen 52 is being executed (running) on the image forming apparatus 12, the display controller 42 of the image forming apparatus 12, for example, causes the ordinary version operation screen 52 to be displayed as a main menu screen on the UI unit 36. Plural icons 54 (e.g., button images) are displayed as display items on the ordinary version operation screen 52. A specific function (e.g., a function of the image forming apparatus 12) is associated with each of the icons 54. For example, when a user indicates or presses a specific icon 54, a specific function associated with this icon 54 is executed. For example, an icon 54 for a copy function, an icon 54 for a scan function, and the like are displayed on the ordinary version operation screen 52. The number of icons 54 displayed on the ordinary version operation screen 52 is larger than that on the simple version operation screen. The size of each icon 50 displayed on the ordinary version operation screen 52 may be smaller than that on the simple version operation screen. The size of characters displayed on the ordinary version operation screen 52 may be smaller than that on the simple version operation screen. For example, a character string attached to each icon 54 is smaller than that on the simple version operation screen. The displayed position of each icon 54, the number of displayed icons 54, a display size of each icon 54, and the like may be changed by a user.

Figure 7:
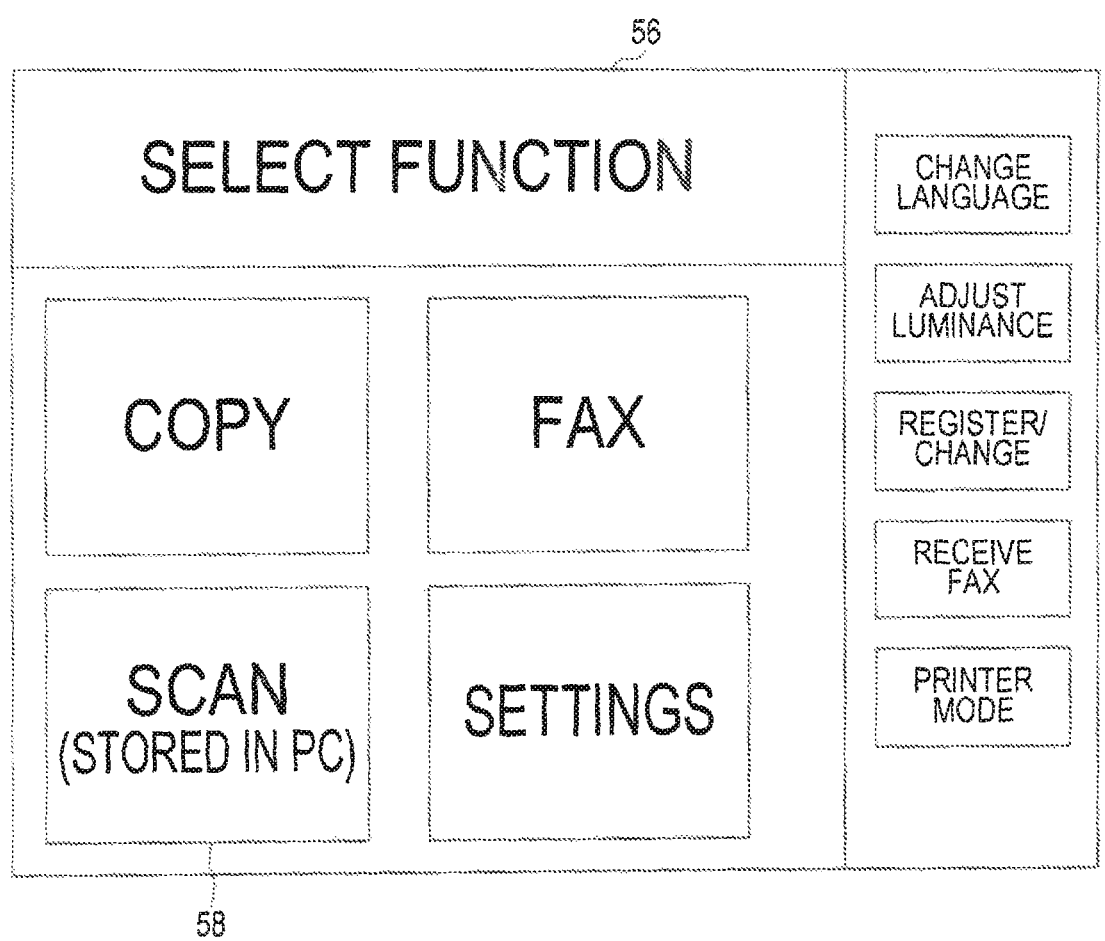
FIG. 7 is a diagram illustrating an example of a simple version operation screen displayed on the image forming apparatus.

A simple version operation screen displayed on the image forming apparatus 12 is described in detail below with reference to FIG. 7. FIG. 7 illustrates an example of this screen. A simple version operation screen 56 is an example of a simple version home operation screen displayed on the image forming apparatus 12. In a case where a home application for the simple version operation screen 56 is being executed (running) on the image forming apparatus 12, the display controller 42 of the image forming apparatus 12, for example, causes the simple version operation screen 56 to be displayed as a main menu screen on the UI unit 36. Plural icons 58 (e.g., button images) are displayed as display items on the simple version operation screen 56. A specific function is associated with each of the icons 58. For example, when a user indicates or presses a specific icon 58, a specific function associated with this icon 58 is executed. The number of icons 58 displayed on the simple version operation screen 56 is smaller than that on the ordinary version operation screen 52. For example, an upper limit of the number of icons 58 displayed on the simple version operation screen 56 is smaller than that on the ordinary version operation screen 52. The upper limit may be set in advance or may be changed by a user. The icons 58 displayed on the simple version operation screen 56 may be icons associated with functions designated by a user or may be icons associated with preset functions (e.g., major functions). In the example illustrated in FIG. 7, an icon 58 for a copy function, an icon 58 for a scan function, and the like are displayed on the simple version operation screen 56. The size of each icon 58 displayed on the simple version operation screen 56 may be larger than that on the ordinary version operation screen 52. The size of characters displayed on the simple version operation screen 56 may be larger than that on the ordinary version operation screen 52. For example, a character string attached to each icon 58 is larger than that on the ordinary version operation screen 52. The displayed position of each icon 58, the number of displayed icons 58, a display size of each icon 58, and the like may be changed by a user.

The display controller 42 causes the ordinary version operation screen 52 or the simple version operation screen 56 to be displayed on the UI unit 36 in accordance with a user's instruction. In First Embodiment, the display controller 42 causes the ordinary version operation screen 52 or the simple version operation screen 56 to be displayed on the UI unit 36 in accordance with control information transmitted from the terminal apparatus 10.

An operation of the image forming system according to First Embodiment is described below.

Figure 8:
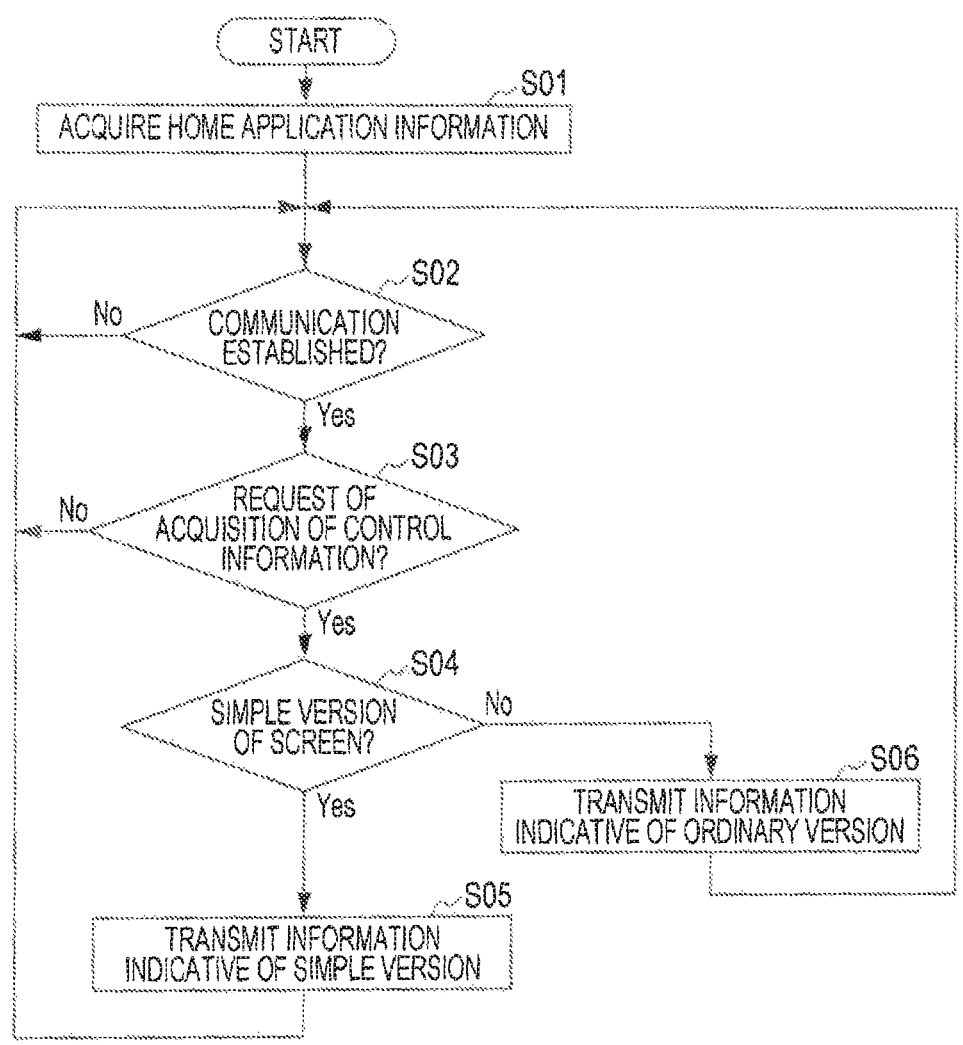
FIG. 8 is a flowchart illustrating an operation of the terminal apparatus according to First Embodiment.

First, an operation of the terminal apparatus 10 is described with reference to FIG. 8. FIG. 8 is a flowchart illustrating the operation.

A user activates an application for short-range wireless communication installed in the terminal apparatus 10. As a result, short-range wireless communication is performed. For example, the application for short-range wireless communication may be activated when an application for image formation such as a print application is activated. Alternatively, the application for short-range wireless communication may be automatically activated when the terminal apparatus 10 is powered on.

Next, the information acquisition unit 26 of the terminal apparatus 10 acquires home application information concerning a home application 22 (S01). For example, in a case where a single home application 22 is stored in the storage unit 18, the information acquisition unit 26 acquires home application information concerning this home application 22. In a case where two home applications 22 are stored in the storage unit 18, the information acquisition unit 26 acquires home application information concerning the home application 22 that is running on the terminal apparatus 10. In another example, the information acquisition unit 26 may acquire model identification information 20 in addition to home application information or instead of home application information.

The operation type identification unit 28 identifies the type of home operation screen of the terminal apparatus 10 on the basis of the information acquired by the information acquisition unit 26. For example, in a case where the home application information indicates a name, an application ID, or the like of a home application 22 for an ordinary version operation screen, the type of the home operation screen is identified as an ordinary version operation screen. Meanwhile, in a case where the home application information indicates a name, an application ID, or the like of a home application 22 for a simple version operation screen, the type of the home operation screen identified as a simple version operation screen. In another example, the operation type identification unit 28 may identify the type of home operation screen of the terminal apparatus 10 on the basis of the model identification information 20. In still another example, the operation type identification unit 28 may identify the type of home operation screen on the basis of the number of display items within the home operation screen displayed by the home application 22 running on the terminal apparatus 10.

In a case where short-range wireless communication has not been established between the terminal apparatus 10 and the image forming apparatus 12 (NO in S02), the terminal apparatus 10 shifts to a standby mode.

In a case where short-range wireless communication has been established between the terminal apparatus 10 and the image forming apparatus 12 (YES in S02), the processing proceeds to Step S03. For example, in a case where Bluetooth is used as short-range wireless communication, communication is established between the terminal apparatus 10 and the image forming apparatus 12 as long as the terminal apparatus 10 is present within a Bluetooth communication range of the image forming apparatus 12. In a case where NFC is used as short-range wireless communication, communication is established between the terminal apparatus 10 and the image forming apparatus 12 when a user brings the terminal apparatus 10 close to a communication interface for NFC provided in the image forming apparatus 12.

In a case where the terminal apparatus 10 has not received a request of acquisition of control information from the image forming apparatus 12 after establishment of short-range wireless communication between the terminal apparatus 10 and the image forming apparatus 12 (NO in S03), the terminal apparatus 10 shifts to a standby mode. In this case, the processing returns to Step S02.

In a case where the terminal apparatus 10 has received a request of acquisition of control information from the image forming apparatus 12 (YES in S03), the processing proceeds to Step S04. For example, the terminal apparatus 10 receives a request of acquisition of control information from the image forming apparatus 12 over the communication pathway N created by short-range wireless communication.

In a case where the home operation screen is a simple version operation screen (YES in S04), the terminal apparatus 10 transmits control information including operation type information indicative of the simple version operation screen to the image forming apparatus 12 over the communication pathway N created by short-range wireless communication (S05).

In a case where the home operation screen is an ordinary version operation screen (NO in S04), the terminal apparatus 10 transmits control information including operation type information indicative of the ordinary version operation screen to the image forming apparatus 12 over the communication pathway N created by short-range wireless communication (S06). The terminal apparatus 10 may transmit control information to the image forming apparatus 12 without waiting for a request of acquisition of control information.

Figure 9:
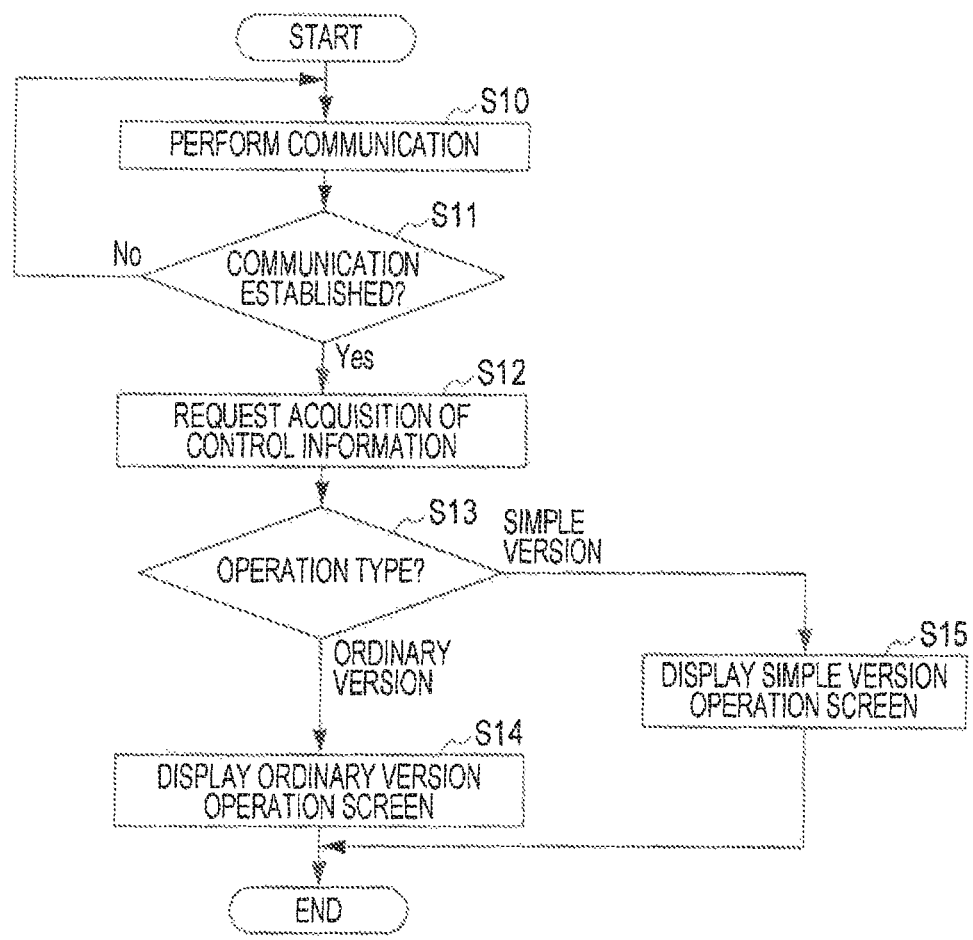
FIG. 9 is a flowchart illustrating an operation of the image forming apparatus according to First Embodiment.

Next, an operation of the image forming apparatus 12 is described with reference to FIG. 9. FIG. 9 is a flowchart illustrating the operation.

First, the image forming apparatus 12 performs short-range wireless communication (S10).

In a case where short-range wireless communication has not been established between the terminal apparatus 10 and the image forming apparatus 12 (NO in S11), the image forming apparatus 12 shifts to a standby mode.

In a case where short-range wireless communication has been established between the terminal apparatus 10 and the image forming apparatus 12 (YES in S11), the processing shifts to Step S12. A method for establishing short-range wireless communication is the same as that described in Step S02.

After establishment of short-range wireless communication between the terminal apparatus 10 and the image forming apparatus 12, the image forming apparatus 12 transmits a request of acquisition of control information to the terminal apparatus 10 over the communication pathway N created by short-range wireless communication (S12).

In a case where Bluetooth is used as short-range wireless communication and where plural terminal apparatuses 10 that have established short-range wireless communication (Bluetooth) with the image forming apparatus 12 are detected, the image forming apparatus 12 acquires information indicative of distances between the image forming apparatus 12 and the terminal apparatuses 10. The controller 38 of the image forming apparatus 12 calculates distances between the image forming apparatus 12 and the terminal apparatuses 10, for example, on the basis of signal intensities of short-range wireless communication (Bluetooth) with the terminal apparatuses 10. The image forming apparatus 12 may transmit a request of acquisition of control information to a terminal apparatus 10 that is closest to the image forming apparatus 12 among the plural terminal apparatuses 10 or may transmit a request of acquisition of control information to a terminal apparatus 10 whose distance from the image forming apparatus 12 is equal to or shorter than a preset threshold value (e.g., 1 m or shorter). In another example, the image forming apparatus 12 may specify approximate positions of the terminal apparatuses 10 by exchange of a signal through short-range wireless communication (Bluetooth) and transmit a request of acquisition of control information to a terminal apparatus 10 of a user standing in front of the image forming apparatus 12.

The control information is transmitted from the terminal apparatus 10 to the image forming apparatus 12 over the communication pathway N created by short-range wireless communication in response to the request of acquisition of control information, and the image forming apparatus 12 receives the control information. The terminal apparatus 10 may transmit control information to the image forming apparatus 12 without waiting for a request of acquisition of control information.

In a case where the control information indicates an ordinary version operation screen (ORDINARY VERSION in S13), the display controller 42 of the image forming apparatus 12 causes an ordinary version operation screen to be displayed on the UI unit 36 of the image forming apparatus 12 (S14). For example, the ordinary version operation screen 52 illustrated in FIG. 6 is displayed on the UI unit 36.

In a case where the control information indicates a simple version operation screen (SIMPLE VERSION in S13), the display controller 42 of the image forming apparatus 12 causes a simple version operation screen to be displayed on the UI unit 36 of the image forming apparatus 12 (S15). For example, the simple version operation screen 56 illustrated in FIG. 7 is displayed on the UI unit 36.

The type of home operation screen need not be identified in the terminal apparatus 10. In this case, control information including operation identification information is not transmitted from the terminal apparatus 10 to the image forming apparatus 12, but instead control information including home application information or control information including model identification information 20 is transmitted from the terminal apparatus 10 to the image forming apparatus 12.

For example, in a case where home application information is included in the control information and where the home application information indicates a specific home application (a home application for a simple version operation screen), the display controller 42 causes a simple version operation screen to be displayed on the UI unit 36. Meanwhile, in a case where the home application information does not indicates the specific home application (the home application for a simple version operation screen), the display controller 42 causes an ordinary version operation screen to be displayed on the UI unit 36.

In another example, in a case where model identification information 20 is included in the control information and the model identification information 20 indicates a specific model (a model of terminal apparatus 10 in which a home application for a simple version operation screen is preinstalled), the display controller 42 causes a simple version operation screen to be displayed on the UI unit 36. Meanwhile, in a case where the model identification information 20 does not indicate the specific model, the display controller 42 causes an ordinary version operation screen to be displayed on the UI unit 36.

As described above, according to First Embodiment, in a case where a simple version operation screen is used in the terminal apparatus 10, a simple version operation screen is also displayed on the image forming apparatus 12. That is, an operation environment similar to the terminal apparatus 10 is achieved on the image forming apparatus 12. For example, a screen on which fewer display items (e.g., button images such as icons) than an ordinary version operation screen are displayed is displayed on the image forming apparatus 12. The size of display items may be larger than that on the ordinary version operation screen, and the size of displayed characters may be larger than that on the ordinary version operation screen.

In a case where short-range wireless communication has been established between the terminal apparatus 10 and the image forming apparatus 12, the terminal apparatus 10 may transmit user identification information for identifying a user of the terminal apparatus 10 to the image forming apparatus 12, and the image forming apparatus 12 may authenticate the user on the basis of the user identification information.

Even in a case where the simple version operation screen 56 is displayed on the UI unit 36 of the image forming apparatus 12, a screen displayed on the UI unit 36 may be switched to the ordinary version operation screen 52 in accordance with a user's instruction. For example, when a user gives an instruction to display the ordinary version operation screen 52 by using the UI unit 36, the display controller 42 of the image forming apparatus 12 causes the ordinary version operation screen 52 to be displayed on the UI unit 36. Furthermore, in a case where the ordinary version operation screen 52 is displayed on the UI unit 36, the screen displayed on the UI unit 36 may be switched to the simple version operation screen 56 in accordance with a user's instruction.

Second Embodiment

An image forming system that is an information processing system according to Second Embodiment of the present invention is described below. The image forming system according to Second Embodiment includes a terminal apparatus 10A instead of the terminal apparatus 10 and includes an image forming apparatus 12A instead of the image forming apparatus 12. The terminal apparatus 10A and the image forming apparatus 12A have a function of communicating with each other over a communication pathway N as in First Embodiment. The terminal apparatus 10A and the image forming apparatus 12A are described in detail below.

Figure 10:
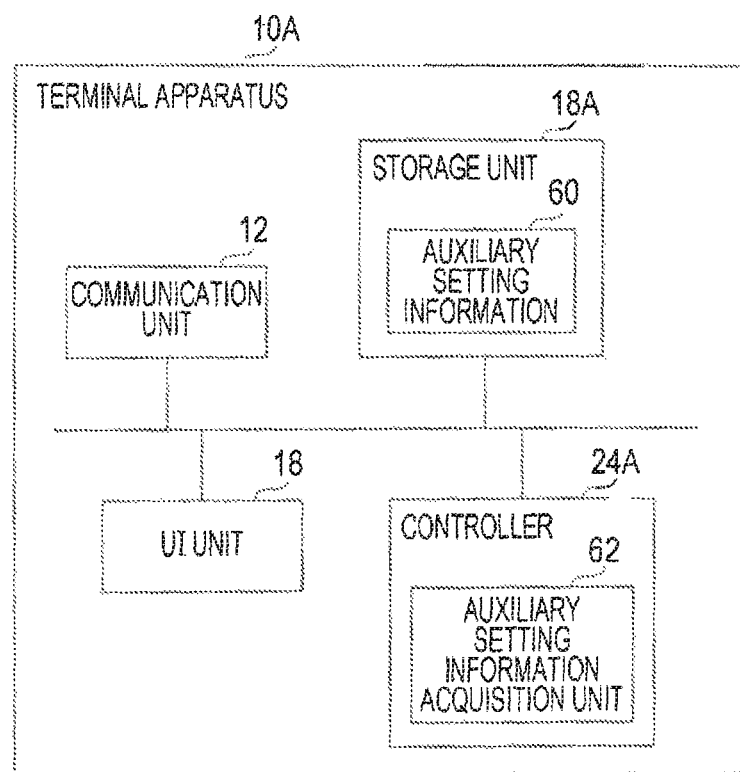
FIG. 10 is a block diagram illustrating a terminal apparatus according to Second Embodiment.

A configuration of the terminal apparatus 10A is described in detail with reference to FIG. 10. FIG. 10 illustrates a configuration of the terminal apparatus 10A according to Second Embodiment.

The terminal apparatus 10A includes a storage unit 18A and a controller 24A instead of the storage unit 18 and the controller 24 of the terminal apparatus 10 according to First Embodiment. The configuration of the terminal apparatus 10A is the same as that of the terminal apparatus 10 according to First Embodiment except for this.

The storage unit 18A is a storage device such as a hard disc or a memory and stores therein, for example, various programs and various data, which may be stored in different storage devices or may be stored in the same storage device. Furthermore, auxiliary setting information 60 is stored in the storage unit 18A.

The auxiliary setting information 60 is setting information used in a case where a screen is displayed on a UI unit 16 of the terminal apparatus 10A. For example, the auxiliary setting information 60 includes information indicative of setting concerning a character size, information indicative of setting concerning luminance and contrast of a screen, information indicative of setting concerning a text read-aloud function, information indicative of the number of display items, and information indicative of setting concerning sensitivity of detection of a contact action (touch action) on a screen displayed on the UI unit 16. The text read-aloud function is a function of reading aloud a character string displayed on a screen. The setting concerning sensitivity of detection of a contact action is, for example, setting (e.g., a period of a long touch) concerning a long touch on a screen (a state where a screen is being continuously touched, i.e., a state where contact on a screen is being continuously detected) or an adjustment value of sensitivity of detection. The character size, luminance and contrast of a screen, ON/OFF of a text read-aloud function, the number of display items, sensitivity of detection of a contact action, and the like are, for example, set by a user of the terminal apparatus 10A, but instead may be set in advance in the terminal apparatus 10A.

The controller 24A controls an operation of each unit of the terminal apparatus 10A. The controller 24A includes an auxiliary setting information acquisition unit 62.

The auxiliary setting information acquisition unit 62 acquires auxiliary setting information 60. Control information including the auxiliary setting information 60 is transmitted from the terminal apparatus 10A to the image forming apparatus 12A.

Figure 11:
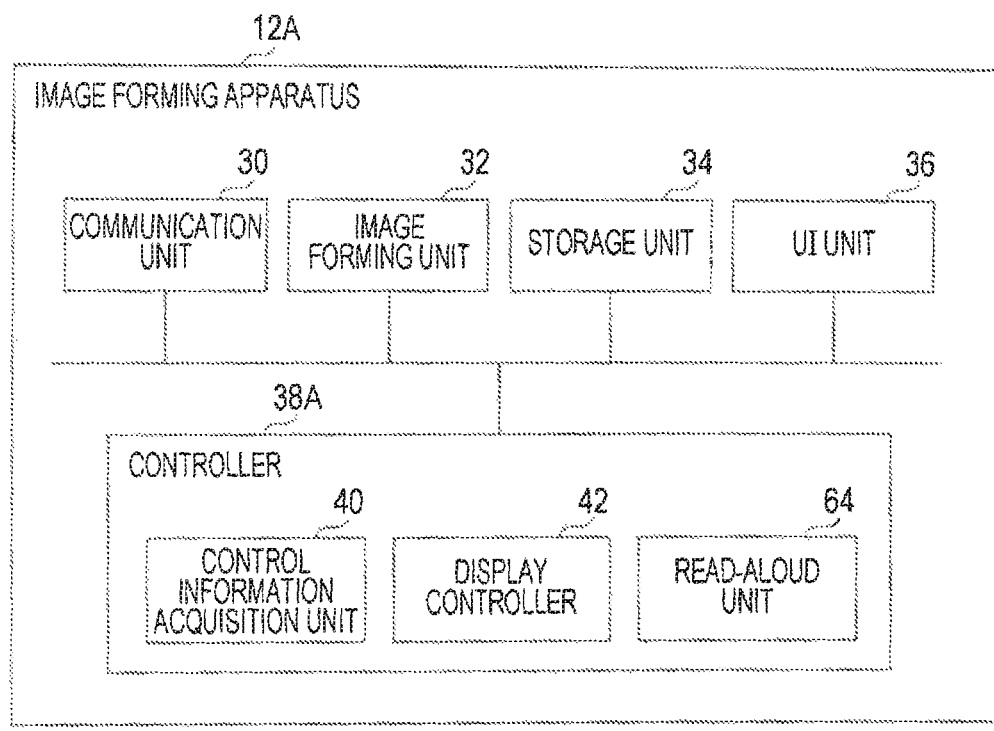
FIG. 11 is a block diagram illustrating an image forming apparatus according to Second Embodiment.

A configuration of the image forming apparatus 12A is described in detail below with reference to FIG. 11. FIG. 11 illustrates a configuration of the image forming apparatus 12A according to Second Embodiment.

The image forming apparatus 12A includes a controller 38A instead of the controller 38 of the image forming apparatus 12 according to First Embodiment. The configuration of the image forming apparatus 12A is the same as that of the image forming apparatus 12 according to First Embodiment except for the controller 38A.

The controller 38A controls an operation of each unit of the image forming apparatus 12A. The controller 38A includes a control information acquisition unit 40, a display controller 42, and a read-aloud unit 64.

The control information acquisition unit 40 acquires control information transmitted from the terminal apparatus 10A. In Second Embodiment, for example, the control information acquisition unit 40 receives control information including auxiliary setting information from the terminal apparatus 10A over a communication pathway N created by short-range wireless communication.

The display controller 42 controls display of a UI unit 36. In Second Embodiment, the display controller 42 causes setting of the UI unit 16 of the terminal apparatus 10A to be reflected in the UI unit 36 of the image forming apparatus 12A in accordance with control information transmitted from the terminal apparatus 10A.

For example, in a case where a character size within a screen is set in the terminal apparatus 10A, i.e., in a case where control information includes auxiliary setting information 60 indicative of a character size, the display controller 42 causes the character size indicated by the auxiliary setting information 60 to be reflected in a character size within a screen displayed on the UI unit 36 of the image forming apparatus 12A.

In a case where luminance and contrast within a screen are set in the terminal apparatus 10A, i.e., in a case where control information includes auxiliary setting information 60 indicative of luminance and contrast, the display controller 42 causes the luminance and contrast indicated by the auxiliary setting information 60 to be reflected in luminance and contrast within a screen displayed on the UI unit 36 of the image forming apparatus 12A.

The read-aloud unit 64 reads aloud a character string displayed on the UI unit 36 of the image forming apparatus 12A. That is, the read-aloud unit 64 converts the character string into voice and outputs the voice. As a result, the character string is read aloud. For example, in a case where the text read-aloud function is on in the terminal apparatus 10A, i.e., in a case where the control information includes auxiliary setting information 60 indicating that the text read-aloud function is on, the controller 39A turns on the read-aloud unit 64. This turns on the text read-aloud function in the image forming apparatus 12A. As a result, a character string displayed on the UI unit 36 is read aloud.

In a case where sensitivity of detection of a contact action on a screen is set in the terminal apparatus 10A, i.e., in a case where the control information includes auxiliary setting information 60 indicative of setting concerning sensitivity of detection, the controller 38A may cause the setting concerning sensitivity of detection to be reflected in sensitivity of detection of a contact action on a screen displayed on the UI unit 36 of the image forming apparatus 12A.

An operation of the image forming system according to Second Embodiment is described below.

Figure 12:
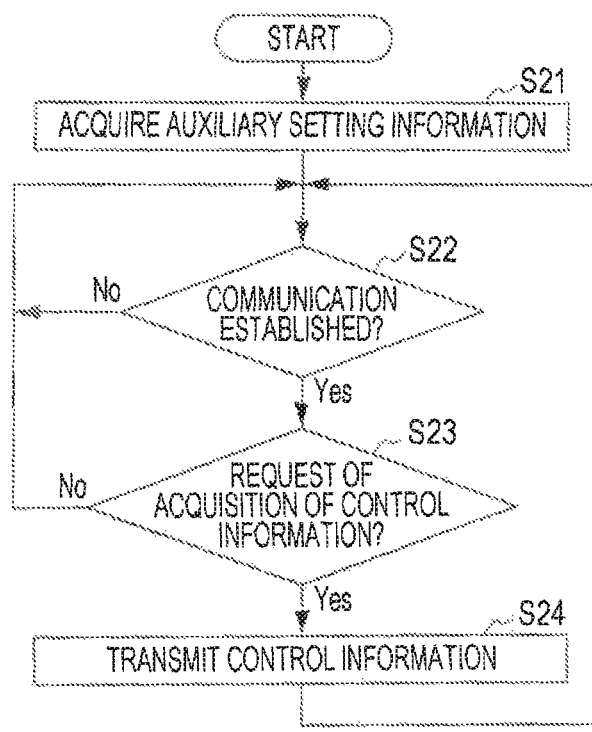
FIG. 12 is a flowchart illustrating an operation of the terminal apparatus according to Second Embodiment.

First, an operation of the terminal apparatus 10A is described with reference to FIG. 12. FIG. 12 is a flowchart illustrating the operation.

A user activates an application for short-range wireless communication installed in the terminal apparatus 10A, as in First Embodiment. As a result, short-range wireless communication is performed.

Next, the auxiliary setting information acquisition unit 62 of the terminal apparatus 10A acquires auxiliary setting information 60 (S21).

In a case where short-range wireless communication has not been established between the terminal apparatus 10A and the image forming apparatus 12A (NO in S22), the terminal apparatus 10A shifts to a standby mode.

In a case where short-range wireless communication has been established between the terminal apparatus 10A and the image forming apparatus 12A (YES in S22), the processing proceeds to Step 923. For example, in a case where Bluetooth is used as short-range wireless communication, communication is established between the terminal apparatus 10A and the image forming apparatus 12A as long as the terminal apparatus 10A is present within a Bluetooth communication range of the image forming apparatus 12A. In a case where NFC is used as short-range wireless communication, communication is established between the terminal apparatus 10A and the image forming apparatus 12A when a user brings the terminal apparatus 10A close to a communication interface for NFC provided in the image forming apparatus 12A.

In a case where the terminal apparatus 10A has not received a request of acquisition of control information from the image forming apparatus 12A after establishment of short-range wireless communication between the terminal apparatus 10A and the image forming apparatus 12A (NO in S23), the terminal apparatus 10A shifts to a standby mode. In this case, the processing returns to Step S22.

In a case where the terminal apparatus 10A has received a request of acquisition of control information from the image forming apparatus 12A (YES in S023), the terminal apparatus 10A transmits control information including auxiliary setting information 60 to the image forming apparatus 12A (S24). For example, the terminal apparatus 10A receives the request of acquisition of control information from the image forming apparatus 12A over the communication pathway N created by short-range wireless communication and transmits control information including auxiliary setting information 60 to the image forming apparatus 12A over the communication pathway N created by short-range wireless communication in response to reception of the request of acquisition. The terminal apparatus 10A may transmit control information to the image forming apparatus 12A without waiting for a request of acquisition of control information.

Figure 13:
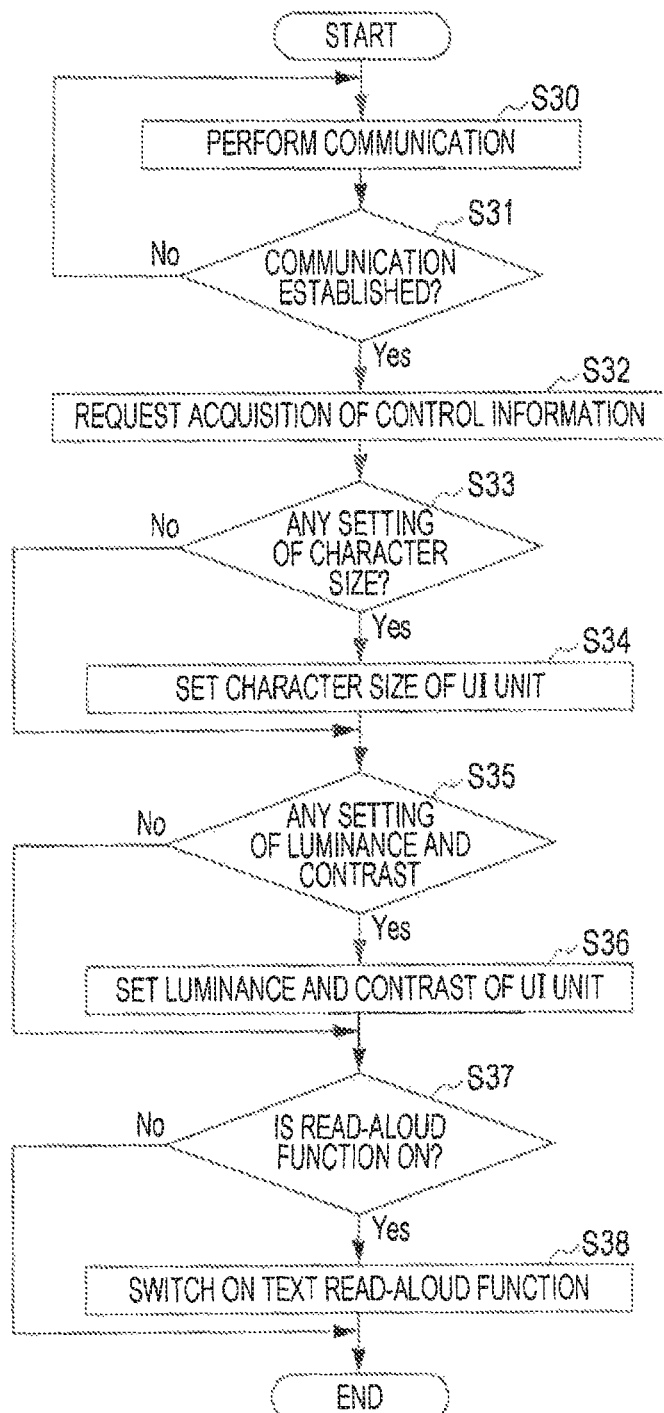
FIG. 13 is a flowchart illustrating an operation of the image forming apparatus according to Second Embodiment.

Next, an operation of the image forming apparatus 12A is described with reference to FIG. 13. FIG. 13 is a flowchart illustrating the operation.

First, the image forming apparatus 12A performs short-range wireless communication (S30).

In a case where short-range wireless communication has not been established between the terminal apparatus 10A and the image forming apparatus 12A (NO in S31), the image forming apparatus 12A shifts to a standby mode.

In a case where short-range wireless communication has been established between the terminal apparatus 10A and the image forming apparatus 12A (YES in S31), the processing proceeds to Step S32. A method for establishing short-range wireless communication is the same as that described in Step S22.

After establishment of short-range wireless communication between the terminal apparatus 10A and the image forming apparatus 12A, the image forming apparatus 12A transmits a request of acquisition of control information to the terminal apparatus 10A over the communication pathway N created by short-range wireless communication (S32).

Also in Second Embodiment, in a case where Bluetooth is used as short-range wireless communication and where plural terminal apparatuses 10A that have established short-range wireless communication (Bluetooth) with the image forming apparatus 12A have been detected, the image forming apparatus 12A may transmit a request of acquisition of control information to a terminal apparatus 10A that is closest to the image forming apparatus 12A or may transmit a request of acquisition of control information to a terminal apparatus 10A whose distance from the image forming apparatus 12A is equal to or shorter than a preset threshold value.

Control information is transmitted from the terminal apparatus 10A to the image forming apparatus 12A over the communication pathway N created by short-range wireless communication in accordance with the request of acquisition of control information, and the image forming apparatus 12A receives the control information. The terminal apparatus 10A may transmit control information to the image forcing apparatus 12A without waiting for a request of acquisition of control information.

In a case where a character size within a screen is set in the terminal apparatus 10A (YES in S33), i.e., in a case where the control information includes auxiliary setting information 60 indicative of a character size, the display controller 42 of the image forming apparatus 12A causes the character size indicated by the auxiliary setting information 60 to be reflected in a character size within a screen displayed on the UI unit 36 of the image forming apparatus 12A (Set). That is, the display controller 42 sets the character size indicated by the auxiliary setting information 60 as a character size within a screen displayed on the UI unit 36. For example, in a case where any of plural settings "large", "medium", and "small" is selected as a character size in the terminal apparatus 10A, the display controller 42 sets a character size within a screen displayed on the UI unit 36 in accordance with the selected setting. For example, in a case where "large" is selected as a character size in the terminal apparatus 10A, the display controller 42 sets "large" as a character size within a screen displayed on the UI unit 36.

In a case where a character size within a screen is not set in the terminal apparatus 10A (NO in S33), i.e., in a case where the control information does not include auxiliary setting information 60 indicative of a character size, the processing proceeds to Step S35. In this case, the display controller 42 sets a character size within a screen displayed on the UI unit 36 in accordance with a preset character size.

In a case where luminance and contrast within a screen is set in the terminal apparatus 10A (YES in S35), i.e., in a case where the control information includes auxiliary setting information 60 indicative of luminance and contrast, the display controller 42 causes luminance and contrast indicated by the auxiliary setting information 60 to be reflected in luminance and contrast within a screen displayed on the UI unit 36 of the image forming apparatus 12A (S36). That is, the display controller 42 sets the luminance and contrast indicated by the auxiliary setting information 60 as luminance and contrast within a screen displayed on the UI unit 36. For example, in a case where any of plural settings "high", "medium", and "low" is selected as luminance in the terminal apparatus 10A, the display controller 42 sets luminance of a screen displayed on the UI unit 36 in accordance with the selected setting. For example, in a case where "high" is set as luminance in the terminal apparatus 10A, the display controller 42 sets "high" as luminance of the screen displayed on the UI unit 36. In a case where any of plural settings "high", "medium", and "low" is selected as contrast in the terminal apparatus 10A, the display controller 42 sets contrast of the screen displayed on the UI unit 36 in accordance with the selected setting. For example, in a case where "high" is set as contrast in the terminal apparatus 10A, the display controller 42 sets "high" as contrast of the screen displayed on the UI unit 36. In a case where high contrast is selected, the display controller 42 sets contrast of the screen so that characters, icons (e.g., button images), and the like displayed on the UI unit 36 become black or white, for example.

In a case where luminance and contrast within a screen are not set in the terminal apparatus 10A (NO in S35), i.e., in a case where the control information includes auxiliary setting information 60 indicative of luminance and contrast, the processing proceeds to Step S37. In this case, the display controller 42 sets luminance and contrast of the screen displayed on the UI unit 36 in accordance with preset luminance and contrast.

In a case where a text read-aloud function is on in the terminal apparatus 10A (YES in S37), i.e., in a case where the control information includes auxiliary setting information 60 indicating that the text read-aloud function is on, the controller 38A turns on the read-aloud unit 64 (S38). As a result, the text read-aloud function is turned on in the image forming apparatus 12A, and a character string displayed on the UI unit 36 is read aloud.

In a case where sensitivity of detection of a contact action (touch action) on a screen is set in the terminal apparatus 10A, i.e., in a case where the control information includes auxiliary setting information 60 indicative of setting of sensitivity of detection, the controller 38A causes the setting of sensitivity of detection to be reflected in sensitivity of detection of a contact action on a screen displayed on the UI unit 36 of the image forming apparatus 12A. That is, the controller 38A sets the sensitivity of detection indicated by the auxiliary setting information 60 as sensitivity of detection of a contact action on a screen displayed on the UI unit 36. For example, in a case where any of plural settings "high", "medium", and "low" is selected as sensitivity of detection in the terminal device 10A, the controller 38A sets sensitivity of detection of a contact action on a screen displayed on the UI unit 36 in accordance with the selected setting. For example, in a case where "high" is set as sensitivity of detection in the terminal apparatus 10A, the controller 38A sets "high" as sensitivity of detection of a contact action on the screen displayed on the UI unit 36.

As described above, according to Second Embodiment, auxiliary setting in the terminal apparatus 10A is reflected in the image forming apparatus 12A, and an operation environment similar to the terminal apparatus 10A is achieved in the image forming apparatus 12A.

The image forming apparatus 12A may perform image forming processing in accordance with setting indicated by auxiliary setting information 60. For example, in a case where a copy function or a print function is used in the image forming apparatus 12A, the image forming apparatus 12A may perform copying or printing in accordance with setting indicated by the auxiliary setting information 60. Specifically, in a case where "large" is set as a character size, the image forming apparatus 12A uses large characters in copying or printing. In another example, the image forming apparatus 12A may perform copying or printing in accordance with setting indicated by auxiliary setting information 60 as for one or more copies and perform copying or printing in accordance with setting of the image forming apparatus 12A as for the other copies.

Also in Second Embodiment, the display controller 42 of the image forming apparatus 12A may cause an ordinary version operation screen 52 or a simple version operation screen 56 to be displayed on the UI unit 36 of the image forming apparatus 12A in accordance with setting indicated by auxiliary setting information 60. For example, in a case where the auxiliary setting information 60 indicates specific setting, the display controller 42 causes the simple version operation screen 56 to be displayed on the UI unit 36.

Specifically, in a case where the number of display items within a screen is set in the terminal apparatus 10A, i.e., in a case where the control information includes auxiliary setting information 60 indicative of the number of display items, the display controller 42 causes the ordinary version operation screen 52 or the simple version operation screen 56 to be displayed on the UI unit 36 of the image forming apparatus 12A in accordance with the number of display items indicated by the auxiliary setting information 60. For example, in a case where the number of display items is equal to or larger than a preset threshold value, the display controller 42 causes the ordinary version operation screen 52 to be displayed on the UI unit 36. In a case where the number of display items is smaller than the preset threshold value, the display controller 42 causes the simple version operation screen 56 to be displayed on the UI unit 36. In another example, in a case where the number of display items is smaller than a reference number of items and where a difference between the number of display items and the reference number of items is equal to or larger than a preset threshold value, the display controller 42 may cause the simple version operation screen 56 to be displayed on the UI unit 36. In a case where the number of display items is equal to or larger than the reference number of items or in a case where the number of display items is smaller than the reference number of items and where the difference between the number of display items and the reference number of items is smaller than the preset threshold value, the display controller 42 may cause the ordinary version operation screen 52 to be displayed on the UI unit 36.

An operation screen displayed on the UI unit 36 of the image forming apparatus 12A may be switched among three or more stages in accordance with the number of display items within a screen in the terminal apparatus 10A. For example, in a case where the number of display items is smaller than a first threshold value, the display controller 42 causes the simple version operation screen 56 to be displayed on the UI unit 36. In a case where the number of display items is equal to or larger than a second threshold value that is larger than the first threshold value, the display controller 42 causes the ordinary version operation screen 52 to be displayed on the UI unit 36. In a case where the number of display items is equal to or larger than the first threshold value and is smaller than the second threshold value, the display controller 42 causes a middle-stage operation screen on which the number of display items is larger than the simple version operation screen 56 and is smaller than the ordinary version operation screen 52 to be displayed on the UI unit 36. The operation screen may be switched among four or more stages. Through such processing, an operation screen more suitable for the number of display items within a screen in the terminal apparatus 10A is displayed on the image forming apparatus 12A.

Regardless of whether the ordinary version operation screen 52 or the simple version operation screen 56 is displayed, in a case where any of a character size, luminance, contrast, a text read-aloud function, and sensitivity of detection of a contact action is set in the terminal apparatus 10A, the setting is reflected in the image forming apparatus 12A.

In another specific example, in a case where "large" or "medium" is set as a character size in the terminal apparatus 10A, the display controller 42 may cause the simple version operation screen 56 to be displayed on the UI unit 36, whereas "small" is set as a character size in the terminal apparatus 10A, the display controller 42 may cause the ordinary version operation screen 52 to be displayed on the UI unit 36. An operation screen displayed on the UI unit 36 may be switched among three or more stages in accordance with a character size. For example, in a case where "large" is set as a character size, the display controller 42 causes the simple version operation screen 56 to be displayed on the UI unit 36. In a case where "small" is set as a character size, the display controller 42 causes the ordinary version operation screen 52 to be displayed on the UI unit 36. In a case where "medium" is set as a character size, the display controller 42 causes a middle-stage operation screen to be displayed on the UI unit 36. The same applies to a case where the operation screen is switched among four or more stages.

Also in Second Embodiment, in a case where the simple version operation screen 56 is displayed, display items (e.g., button images such as icons) may be larger than those on the ordinary version operation screen 52.

Third Embodiment

An image forming system that is an information processing system according to Third Embodiment of the present invention is described below. The image forming system according to Third Embodiment is a combination of the image forming system according to First Embodiment and the image forming system according to Second Embodiment. That, is, a terminal apparatus according to Third Embodiment has the configuration of the terminal apparatus 10 according to First Embodiment and the configuration of the terminal apparatus 10A according to Second Embodiment, and an image forming apparatus according to Third Embodiment has the configuration of the image forming apparatus 12 according to First Embodiment and the configuration of the image forming apparatus 12A according to Second Embodiment.

The terminal apparatus according to Third Embodiment acquires home application information and acquires auxiliary setting information 60 and transmits control information including operation type information and the auxiliary setting information 60 to the image forming apparatus according to Third Embodiment. The terminal apparatus may acquire model identification information 20 and transmit control information including the model identification information 20 to the image forming apparatus.

A display controller 42 of the image forming apparatus according to Third Embodiment causes an ordinary version operation screen 52 or a simple version operation screen 56 to be displayed on a UI unit 36 in accordance with operation identification information or model identification information 20 included in the control information, as in First Embodiment. Furthermore, the display controller 42 causes setting indicated by the auxiliary setting information 60 included in the control information to be reflected in the UI unit 36, as in Second Embodiment. For example, in a case where the operation identification information indicates the simple version operation screen 56, "large" is set as a character size, and "high" is set as luminance and contrast, the display controller 42 causes the simple version operation screen 56 to be displayed on the UI unit 36, sets "large" as a size of characters displayed on the simple version operation screen 56, and sets "high" as luminance and contrast of the simple version operation screen 56. Furthermore, in a case where a read-aloud function is on in the terminal apparatus, a read-aloud function is also turned on in the image forming apparatus, and in a case where sensitivity of detection of a contact action is set in the terminal apparatus, the sensitivity of detection in the terminal apparatus is set as sensitivity of detection in the image forming apparatus.

Also in Third Embodiment, in a case where the simple version operation screen 56 is displayed, display items (e.g., button images such as cons) may be larger than those on the ordinary version operation screen 52.

In First through Third Embodiments, the information processing apparatus is not limited to the image forming apparatuses 12 and 12A, and an apparatus having a user interface unit (UI unit) such as a home electrical appliance, a vending machine, an automatic ticket machine, or a digital signage may be the information processing apparatus according to any of First through Third Embodiments. In this case, a simple version operation screen or an ordinary version operation screen is displayed on the UI unit of the information processing apparatus such as a home electrical appliance or a vending machine in accordance with a home application used in the terminal apparatus 10, as in First Embodiment. Furthermore, the size of characters displayed on the UI unit of the information processing apparatus such as a home electrical appliance or a vending machine may be changed in accordance with the size of characters displayed on a screen of the terminal apparatus 10, and luminance and contrast of a screen displayed on the UI unit of the information processing apparatus such as a home electrical appliance or a vending machine may be changed in accordance with luminance and contrast of the screen displayed on the terminal apparatus 10.

Each of the terminal apparatuses 10 and 10A and the age forming apparatuses 12 and 12A is obtained, for example, by cooperation of a hardware resource and software. Specifically, each of the terminal apparatuses 10 and 10A and the image forming apparatuses 12 and 12A includes one or more processors such as CPUs (not illustrated). The one or more processors read out and execute a program stored in a storage device (not illustrated). The function of each unit of the terminal apparatuses 10 and 10A and the image forming apparatuses 12 and 12A is thus achieved. The program is stored in the storage device after being stored in a recording medium such as a CD or a DVD or after being transmitted over a communication pathway such as a network. In another example, each unit of the terminal apparatuses 10 and 10A and the image forming apparatuses 12 and 12A may be obtained, for example, by a hardware resource such as a processor or an electronic circuit. In this case, a device such as a memory may be used. In another example, each unit of the terminal apparatuses 10 and 10A and the image forming apparatuses 12 and 12A may be obtained, for example, by a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
  acquire, from a terminal apparatus, control information including model identification information for identifying a model of the terminal apparatus and setting information concerning display setting of a screen of the terminal apparatus; and
  cause a screen to change display in accordance with the control information.

2. The information processing apparatus according to claim 1, wherein the processor is programmed to:
  cause the screen to display a screen different from an ordinary screen in a case where the model identification information included in the control information indicates a specific model or in a case where the setting information included in the control information indicates a specific setting.

3. The information processing apparatus according to claim 1, further comprising:
  a wireless communication device that wirelessly communicates with the terminal apparatus, and wherein
  the processor is programmed to acquire the control information, from the terminal device, over a communication pathway created by the wireless communication device.

4. The information processing apparatus according to claim 3, wherein
  the wireless communication device transmits a request of acquisition of control information to the terminal apparatus, over the communication pathway, in a case where the wireless communication has been established between the information processing apparatus and the terminal apparatus.

5. A non-transitory computer readable medium storing a program causing a computer to execute a process for image processing comprising:

acquiring, from a terminal apparatus, control information including model identification information for identifying a model of the terminal apparatus and setting information concerning display setting of a screen of the terminal apparatus; and causing a screen to change display in accordance with the control information.

6. An information processing method comprising:

acquiring, from a terminal apparatus, control information including model identification information for identifying a model of the terminal apparatus and setting information concerning display setting of a screen of the terminal apparatus; and causing a screen to change display in accordance with the control information.

* * * * *